United States Patent Office 3,556,709
Patented Jan. 19, 1971

3,556,709
POLYOLEFIN FIBER DYEING WITH AN ARYLAZO 8 - HYDROXY - QUINOLINE - 5 - SULFONIC ACID AND FIBERS SO DYED
Marcel Georges Jirou, Sotteville-les-Rouen, and Joseph Khachoyan, Sierentz, France, assignors to Ugine Kuhlmann, Paris, France
No Drawing. Continuation-in-part of application Ser. No. 455,298, May 12, 1965. This application Sept. 27, 1967, Ser. No. 671,095
Claims priority, application France, May 15, 1964, 974,618
Int. Cl. D06p 1/02
U.S. Cl. 8—42      8 Claims

ABSTRACT OF THE DISCLOSURE

The coloration of fibers of alpha olefin polymers containing metals, with a phenylazo-8-hydroxyquinoline-5-sulfonate with or without a 6-methyl group in the quinoline radical. The phenyl group may be substituted by halogen, methyl, alkoxy, nitro or cyano groups. The fibers are exemplified with polypropylene with nickel salts.

The present application is a continuation-in-part of applicants' copending parent application Ser. No. 455,298 filed May 12, 1965.

The present invention concerns a process for the coloration of alpha-olefin polymers.

It is difficult to obtain colorations on synthetic fibers based on polymers of alpha-olefin such as polypropylene which are fast to light and to dry cleaning with chlorinated solvents. It has been proposed to remove this drawback by incorporating metals such as nickel, chromium, cobalt, or aluminium, which enable metallisable or lakeable dyestuffs to be fixed firmly on the fibers.

French Pat. No. 1,320,986 of Mar. 2, 1962, describes the coloration of polypropylene fibers containing metals of Groups IIa, IIb or IVb of the Periodic Table, i.e. magnesium, calcium, strontium, barium, cadmium, zinc, tin or lead, excluding metals of other groups, e.g. nickel, cobalt, chromium or aluminium, with dyestuffs belonging to the arylazo 8-hydroxy-quinoline series.

The present invention relates to the application of the dyeing of fibers based on alpha-olefin polymers, such as polypropylene, containing metals, especially nickel, of dyestuffs of the general formula:

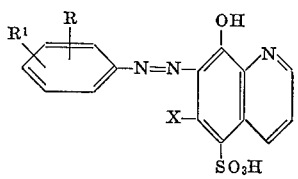

in which X represents hydrogen or methyl and R and $R^1$ each represent hydrogen, halogen, methyl, alkoxy, nitro or cyano.

Compared with analogous unsulphonated dyestuffs, the dyestuffs which may be used according to the invention in many cases show a better affinity for the fiber especially in the case of very deep shades. They are suitable for the coloration of fibers in whatever form they may be present, e.g. wadding, carded material, yarn or fabric. They may be used in dyeing or printing, according to the various known industrial techniques, such as dyeing in an open bath, with a circulating apparatus, in a vat or jig, and dyeing by foularding. Further, these dyestuffs have the advantage that they may be applied at 90–100° C. without the addition of a vehicle. In spite of the solubility which the sulphonic group confers on the dyestuffs, it is advantageous to apply them in a dispersed form The following examples, in which the parts are parts by weight, are given without the invention being limited thereto:

EXAMPLE 1

25 parts of polypropylene fibers containing nickel were introduced into a dyebath comprising 1000 parts of water, one part of the product resulting from the condensation of one mole of caster oil with 40 moles of ethylene oxide, one part of acetic or formic acid and a quantity of dispersed dyestuff corresponding to 0.25 to 1 part of a pure dyestuff prepared by coupling one mole of the diazo derivative of 4 - nitro - 2 - cyano - aniline with one mole of 6-methyl-8-hydroxy-quinoline-5-sulphonic acid. The bath was heated to boiling and kept at the boil for 2 hours. The fibers were rinsed and stripped in an alkaline reducing bath. A navy blue shade was obtained which possessed good fastness to light and an excellent fastness to the chlorinated solvents used in dry cleaning.

EXAMPLE 2

25 parts of polypropylene fibers containing nickel were introduced into a dyebath analogous to that of Example 1, containing a quantity of dispersed dyestuff corresponding to 0.25 to 1 part of a pure dyestuff prepared by coupling one mole of the diazo derivative of 4-nitro-2-cyano-aniline with one mole of 8-hydroxy-quinoline-5-sulphonic acid. The bath was heated to boiling and maintained at the boil for 2 hours. The fibers were rinsed and stripped in an alkaline reducing medium. A navy blue shade with very good fastness to light and an excellent fastness to the chlorinated solvents used in dry cleaning was obtained.

When this dyestuff was compared with the corresponding unsulphonated one, a fall of the tinctorial yield for a light shade was observed; on the other hand, the tinctorial yield was superior for a dark shade.

EXAMPLE 3

25 parts of polypropylene fibers containing nickel were introduced into a dyebath analogous to that of Example 1, containing a quantity of dispersed dyestuff corresponding to 0.25 to 1 part of a pure dyestuff prepared by coupling one mole of the diazo derivative of 2,4-dinitro-aniline with one mole of 6-methyl-8-hydroxy-quinoline-5-sulphonic acid. The bath was heated to boiling and kept at the boil for 2 hours. The fibers were rinsed and stripped in an alkaline reducing medium. A navy blue shade was obtained with good fastness to light and excellent fastness to the chlorinated solvents used in dry cleaning.

EXAMPLE 4

25 parts of polypropylene fibers containing nickel were introduced into a dyebath analogous to that of Example 1, but containing a quantity of dispersed dyestuff corresponding to 0.25 to 1 part of a pure dyestuff prepared by coupling one mole of 4-nitro-2-chloro-aniline with one mole of 6-methyl-8-hydroxy-quinoline-5-sulphonic acid. The bath was heated to boiling and kept at the boil for 2 hours. The fibers were rinsed and stripped in an alkaline reducing medium. A dark bordeaux shade was obtained with good fastness to light and excellent fastness to the chlorinated solvents used in dry cleaning.

EXAMPLE 5

A printing paste was prepared with 1000 parts of tragacanth-starch thickener, 5 parts of acetic or formic acid and a quantity of dispersed dyestuff corresponding to 5 to 10 parts of a pure dyestuff prepared by coupling one mole of the diazo derivative of 4-nitro-2-cyano-aniline with one mole of 6-methyl-8-hydroxy-quinoline - 5 - sulphonic acid. A fabric made of fibers of polypropylene containing nickel was printed on a roller or on a frame. The C. The fabric was vigorously washed in a bath of soap and sodium carbonate at the boil and stripped in an alkaline reducing bath. A navy blue shade was obtained which possessed excellent fastness to the chlorinated solvents used in dry cleaning and good fastness to light.

In the foregoing examples it is understood that the term "stripped" merely means that the excess or unfixed dyestuff is removed.

EXAMPLES 6 TO 11

On replacing the dyestuff used in Examples 1 and 5 by the dyestuffs enumerated in the table below, shades were obtained with similar properties.

TABLE I

| Example | Dyestuff derived from— | | Shade on polypropylene fibers containing nickel |
|---|---|---|---|
| | Diazotized base | Coupling compound | |
| 6 | 2,5-dichloro-aniline | 6-methyl-8-hydroxy-quinoline-5-sulphonic acid | Red. |
| 7 | 3,4-dimethyl-aniline | do | Orange. |
| 8 | 4-nitro-aniline | do | Bordeaux. |
| 9 | 4-chloro-aniline | do | Orange. |
| 10 | 3-methoxy-aniline | do | Do. |
| 11 | 4-nitro-2-chloro-aniline | 8-hydroxy-quinoline-5-sulphonic acid | Violet. |

We claim:
1. Process for the coloration of fibers based on a polymer of an alpha-olefin containing a metal which comprises applying thereto a dyestuff of the general formula:

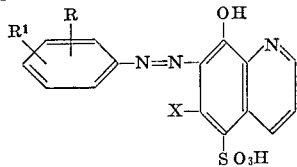

wherein X represents a member selected from the group consisting of hydrogen and methyl, and R and $R^1$ each represent a member selected from the group consisting of hydrogen, and halogen atoms, methyl, alkoxy, nitro and cyano groups.

2. Process according to claim 1 wherein the polymer is polypropylene.
3. Process according to claim 1 wherein the metal is nickel.
4. Process according to claim 1 wherein the dyestuff is applied in dispersed form.
5. Process according to claim 1 wherein the coloration is effected by dyeing in an open bath at a temperature of 90° C. to 100° C.
6. Fibers based on a polymer of an alpha-olefin containing a metal colored by a dyestuff of the general formula:

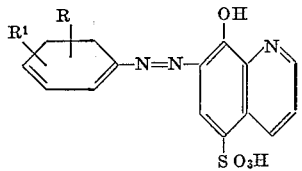

wherein X represents a member selected from the group consisting of hydrogen and methyl, and R and $R^1$ each represent a member selected from the group consisting of hydrogen and halogen atoms, methyl, alkoxy, nitro, and cyano groups.

7. Fibers according to claim 6 wherein the metal is nickel.
8. Fibers according to claim 7 wherein the polymer is polypropylene.

References Cited

FOREIGN PATENTS 642,346   5/1964   Belgium _____ 8—42

DONALD LEVY, Primary Examiner

U.S. Cl. X.R.

8—62, 173